United States Patent
Kanebako

(10) Patent No.: US 6,933,644 B2
(45) Date of Patent: Aug. 23, 2005

(54) MAGNETIC LEVITATION MOTOR

(75) Inventor: Hideki Kanebako, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 10/476,707

(22) PCT Filed: May 17, 2002

(86) PCT No.: PCT/JP02/04799
§ 371 (c)(1),
(2), (4) Date: Nov. 4, 2003

(87) PCT Pub. No.: WO02/095904
PCT Pub. Date: Nov. 28, 2002

(65) Prior Publication Data
US 2004/0135450 A1 Jul. 15, 2004

(30) Foreign Application Priority Data
May 18, 2001 (JP) ........................ 2001-149041

(51) Int. Cl.[7] .................. H02K 7/09; H02K 21/06; H02K 21/12; F16C 32/04
(52) U.S. Cl. ................ 310/90.5; 310/156.53; 310/156.56
(58) Field of Search .............. 310/90.5, 156.53, 310/156.56

(56) References Cited

U.S. PATENT DOCUMENTS

| | | | |
|---|---|---|---|
| 5,886,440 A | * | 3/1999 | Hasebe et al. ......... 310/156.19 |
| 5,945,760 A | * | 8/1999 | Honda et al. .......... 310/156.53 |
| 6,034,460 A | * | 3/2000 | Tajima et al. ................ 310/179 |
| 6,133,662 A | * | 10/2000 | Matsunobu et al. ... 310/156.53 |
| 6,359,357 B1 | * | 3/2002 | Blumenstock ............. 310/90.5 |
| 6,420,810 B1 | * | 7/2002 | Jeong ........................ 310/90.5 |
| 6,727,616 B1 | * | 4/2004 | Gabrys et al. ............. 310/90.5 |

FOREIGN PATENT DOCUMENTS

| | | |
|---|---|---|
| JP | 3-26272 | 3/1991 |
| JP | 05-087141 | 4/1993 |
| JP | 07-083188 | 3/1995 |
| JP | 07-208470 | 8/1995 |
| JP | 10-094217 | 4/1998 |
| JP | 10-201170 | 7/1998 |
| JP | 2000-184655 | 6/2000 |

* cited by examiner

Primary Examiner—Tran Nguyen
(74) Attorney, Agent, or Firm—Notaro&Michalos PC

(57) ABSTRACT

A magnetic levitation motor which rotates a rotor in a levitated state with respect to a stator by a direct-current magnetic field and stator windings. The magnetic levitation motor comprises: a direct-current magnetic field generating device (4) which forms a magnetic flux having a radial pattern with an axis at the center in a stator (2) and a rotor (3); a first stator winding (6) for generating a levitation control magnetic flux (5) to control levitation of the rotor (3) in a radial direction; and a second stator winding (7) for generating a rotating magnetic field to rotate the rotor (3). The rotor (3) is provided with a yoke portion (9) and a motor magnet (10) which are opposed to a stator core (8) of the stator (2). A part of a bias magnetic flux (11) and a part of a levitation control magnetic flux (5) form a magnetic circuit directly reaching the stator core from the yoke, thereby increasing a levitation force of the rotor.

12 Claims, 12 Drawing Sheets

MAGNETIC LEVITATION MOTOR

TECHNICAL FIELD

The present invention relates to a magnetic levitation motor. More particularly, the present invention relates to a magnetic levitation motor which controls a rotor to be levitated and rotates the rotor by a direct-current magnetic field and stator windings.

BACKGROUND ART

In recent years, a magnetic bearing has been developed as a substitute for a contact type bearing. Since this magnetic bearing supports a rotor in a non-contact state, a friction coefficient becomes substantially zero, thereby enabling high-speed rotation. Further, since this magnetic bearing does not require a lubricating oil, it can be used in a special environment such as a high-temperature atmosphere, a low-temperature atmosphere or a vacuum, and it does not need maintenance. Thus, using this magnetic bearing to support a rotor of a motor has been considered.

For example, as shown in FIG. 10, there has been developed a magnetic levitation motor 107 comprising: a rotor 101 being a magnetic substance surrounding a stator core 102; motor magnets 103 arranged and fixed to inner peripheral surfaces of both end portions of the rotor 101 so as to be opposed to an outer peripheral surface of the stator core 102; direct-current magnetic field generating means 105 each of which is provided on a stator 109 side and is a permanent magnet which generates a direct-current magnetic field (bias magnetic field) 104 which spreads in a radial pattern; a first stator winding 106 which generates a levitation control magnetic flux (not shown) which controls levitation of the rotor 101 in a radial direction; and a second stator winding 111 which generates a rotating magnetic field to rotate the rotor 101 (see Japanese patent application laid-open No. 2000-184655). It is to be noted that the first stator winding 106 and the second stator winding 111 are illustrated as one coil in FIG. 10 in order to simplify the drawing, but they are actually different coils. The first stator winding 106 is wound as shown in FIG. 11. It is to be noted that FIG. 11 shows only the stator winding in a direction y. Actually, besides the illustrated stator winding, a stator winding in a direction x and respective motor windings having phases U, V and Z are provided.

In this magnetic levitation motor 107, a regular brushless motor and a magnetic bearing are simultaneously constituted between the rotor 101 and the stator 109. Furthermore, the rotor 101 is levitated in the radial direction by a bias magnetic flux generated by the direct-current magnetic field generating means 105 and a levitation control magnetic flux (not shown) generated by the first stator winding 106. Moreover, the rotor 101 is levitated in an axial direction by a thrust bearing winding 108 provided to the stator 109. Here, the stator core 102 and the motor magnet 103 opposed thereto have the same thickness in the axial direction.

In the above-described magnetic levitation motor 107, however, since the motor magnet 103 and the stator core 102 have the same thickness in the axial direction, the bias magnetic flux 104 and the levitation control magnetic flux (not shown) necessarily go through the motor magnet 103, and a magnetic resistance becomes large when forming a magnetic circuit of the bias magnetic flux 104 and the levitation control magnetic flux. That is because an air gap G between the rotor 101 and the stator core 102 cannot be sufficiently reduced since the motor magnets 103 are interposed between the rotor 101 and the stator core 102. Therefore, the sufficient bias magnetic flux 104 and levitation control magnetic flux cannot be generated, and it is difficult to increase a levitation force of the rotor 101 in the radial direction. In particular, when the magnetic levitation motor 107 is reduced in size, these problems prominently appear.

It is, therefore, an object of the present invention to provide a magnetic levitation motor which can increase a levitation force of a rotor in a radial direction.

SUMMARY OF THE INVENTION

To achieve this aim, according to the present invention, there is provided a magnetic levitation motor which rotates a rotor in the levitated state relative to a stator, the magnetic levitation motor comprising: a direct-current magnetic field generating means for forming a bias magnetic flux having a radial pattern with an axis at the center in the stator and the rotor; a first stator winding for generating a levitation control magnetic flux to control the rotor to be levitated in a radial direction; and a second stator winding for generating a rotating magnetic field to rotate the rotor, wherein the rotor has a yoke portion and a motor magnet opposed to a stator core of the stator.

Therefore, since the motor magnet and the yoke portion are opposed to a peripheral surface of the stator core, a part of the bias magnetic flux and a part of the levitation control magnetic flux go through the motor magnet, but the remaining magnetic fluxes directly reach the stator core from the yoke portion without passing through the motor magnet. As a result, as compared with a case that the motor magnet is opposed to the entire peripheral surface of the stator core like the prior art, since an air gap can be reduced at least at a part where the yoke portion and the stator core are directly opposed to each other, it is possible to decrease a magnetic resistance when forming the bias magnetic flux and the levitation control magnetic flux. Accordingly, a magnetic flux density can be increased in the air gap between the rotor and the stator core, thereby increasing a levitation force of the rotor.

In the magnetic levitation motor according to the present invention, it is preferable that the direct-current magnetic field generating means is a permanent magnet. In this case, since a direct-current magnetic field for bias is generated by the permanent magnet, a power for magnetic flux generation is not required. Additionally, when the direct-current magnetic flux generating means is set on the stator side, the direct-current magnetic field may be generated by an electromagnet.

Further, in the magnetic levitation motor according to the present invention, it is preferable that the stator core has salient-pole portions formed so as to outwardly protrude in a radial pattern, the yoke portion has a motor magnet attachment step portion having a thickness in an axial direction smaller than a thickness of the stator core in the axial direction and a thickness of the motor magnet attachment step portion in a radial direction is set substantially equal to a thickness of the motor magnet in the radial direction.

Furthermore, in the magnetic levitation motor according to the present invention, it is preferable that the motor magnet and the direct-current magnetic field generating means are attached on both sides with a stator core opposed portion of the yoke portion which is opposed to the stator core and excludes the motor magnet attachment step portion being sandwiched therebetween. Of course, the direct-current magnetic field generating means may be arranged on the stator side.

Moreover, in the magnetic levitation motor according to the present invention, it is preferable that the number of magnetic poles of the rotor is not less than six. In this case, since the first stator winding and the second stator winding can be provided to the same stator core and magnetic levitation and turning force generation can be individually performed, thereby reducing the number of rotors and the stator cores.

Additionally, in the magnetic levitation motor according to the present invention, it is preferable that the motor magnet is a permanent magnet attached to a peripheral surface of the rotor. In this case, a simple structure that the permanent magnet is attached on the peripheral surface of the rotor is provided, thus facilitating manufacture.

Further, in the magnetic levitation motor according to the present invention, it is preferable that the motor magnet is a permanent magnet embedded in the peripheral surface of the rotor. In this case, since the permanent magnet is embedded in the peripheral surface of the rotor, a firm structure with the high motor magnet attachment strength can be obtained.

DETAILED DESCRIPTION OF THE INVENTION

Figure 1:
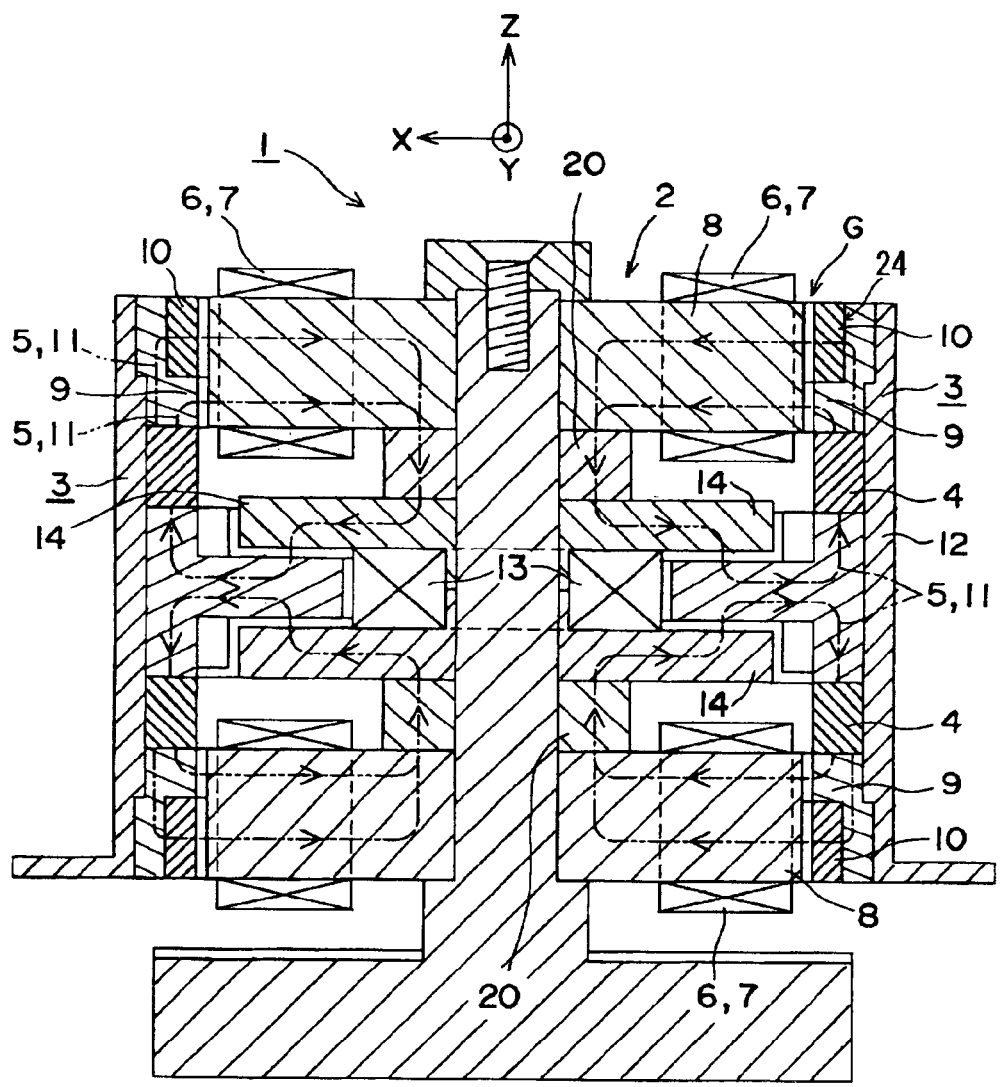
FIG. 1 is a vertical cross-sectional front view showing a magnetic levitation motor according to the present invention.

A structure of the present invention will now be described in detail hereinafter with an illustrated embodiment. FIG. 1 shows an embodiment of a magnetic levitation motor 1 according to the present invention. This magnetic flux motor 1 rotates a rotor 3 in a levitated state with respect to a stator. The magnetic levitation motor 1 according to this embodiment is of an outer rotor type that the stator 2 is positioned on the inner side whilst the rotor 3 is placed on the outer side.

This magnetic levitation motor 1 includes: direct-current magnetic field generating means 4 for forming a bias magnetic flux 11 having a radial pattern with an axis at the center in the stator 2 and the rotor 3; a first stator winding 6 for generating a levitation control magnetic flux 5 which controls the rotor 3 to be levitated in a radial direction; and a second stator winding 7 for generating a rotating magnetic field to rotate the rotor 3. Furthermore, the rotor 3 includes a yoke portion 9 and a motor magnet 10 so as to be opposed to a stator core 8 of the stator 2. Therefore, since the motor magnet 10 and the yoke portion 9 are opposed to a peripheral surface of the stator core 8, a part of the bias magnetic flux 11 and a part of the levitation control magnetic flux 5 go through the motor magnet 10, and the remaining magnetic fluxes 5 and 11 form a magnetic circuit directly reaching the stator core 8 from the yoke portion 9 without passing through the motor magnet 10. As a result, since magnetic resistance when forming the magnetic circuit of the bias magnetic flux 11 and the levitation control magnetic flux 5 can be reduced, a levitation force of the rotor 3 can be increased.

Figure 5:
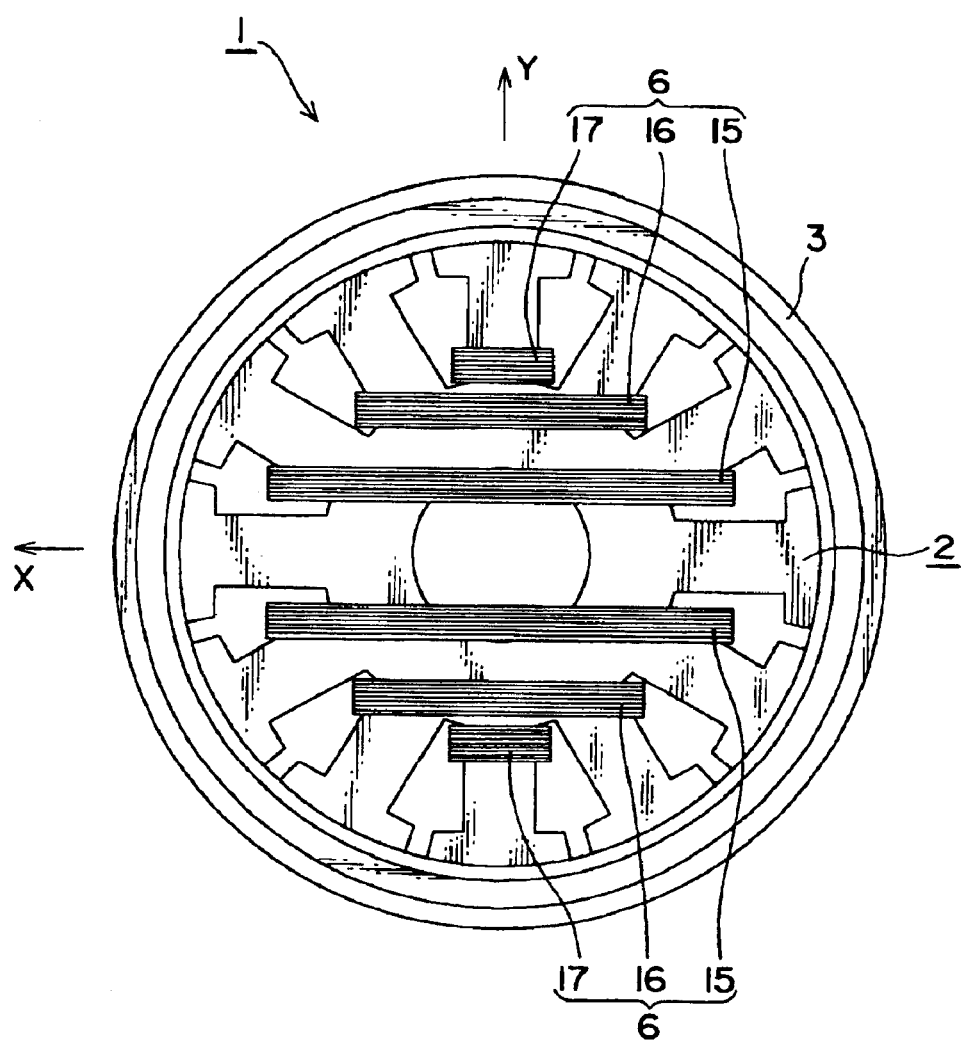
FIG. 5 is a plane view showing how to wind a first stator winding.

It is to be noted that FIG. 1 shows the first stator winding 6 and the second stator winding 7 as one coil in order to simplify the illustration, but they are actually formed by different coils. For example, the second stator winding 7 which generates a rotating magnetic field is wound around each salient-pole, and the first stator winding 6 which generates a levitation control magnetic flux 5 in directions x and y is wound therearound in such a manner that the first stator winding 6 in the direction y and also the first stator winding 6 in the direction x, which seems to be obtained by rotating the first stator winding 6 in the direction y by 90 degrees, overlap as shown in FIG. 5, for example. Further, in the magnetic levitation motor 1 according to this embodiment, the magnetic fluxes from the upper and lower sides collide with each other in a thrust bearing portion at the central part, and respective magnetic circuits are constituted on the upper side and the lower side of the stator 2. That is, this magnetic levitation motor 1 is of a five-axis control type which controls five axes, i.e., the direction x and the direction y on the upper side, the direction x and the direction y on the lower side and a direction z on the thrust side in FIG. 1. Furthermore, the first stator winding 6 is stretched between and wound around a plurality of slots as shown in FIG. 5. As a result, a composite maximum winding number can be doubled as compared with a case that the winding is individually wound around each slot. Therefore, a greater levitation force can be obtained. It is to be noted that FIG. 5 shows only the stator winding in the direction y. Actually, besides the illustrated stator winding, there are provided the stator winding in the direction x and respective motor windings having phases U, V and Z.

The rotor 3 is a magnetic substance. This rotor 3 is formed by combining a cylindrical outer wall portion 12 and yoke portions 9 provided on the inner side thereof. In this embodiment, a motor magnet 10 being a permanent magnet is embedded by press fitting in each motor magnet attachment step portion 24 constituted by a concave portion formed to a part of the yoke portion 9 arranged at a position opposed to the stator core 8. Moreover, the yoke portion 9 and the motor magnet 10 are provided in such a manner that they are both opposed to the outer peripheral surface of the stator core 8. The motor magnet attachment step portion 24 used to fit and hold the motor magnet 10 is formed into a concave portion having the same depth as a thickness of the motor magnet 10 in a radial direction and having a thickness in an axial direction smaller than a thickness of the stator core 8 in the axial direction by making an outer end side of the yoke portion 9 having the same thickness in the axial direction as a thickness of a peripheral surface of the stator core 8 in the axial direction to be thin toward the outer side in the radial direction. Therefore, when the motor magnet 10 is attached to the motor magnet attachment step portion 24, the motor magnet 10 and a part of the yoke portion 9 form the same air gap G with respect to the stator core 8. Here, the motor magnet 10 may be embedded in the yoke portion 9 by attachment or bonding, or it may be press-fitted, attached or bonded to the yoke portion 9 without being embedded.

Additionally, the number of magnetic poles of the rotor 3 is not less than six. In this case, since the first stator winding 6 and the second stator winding 7 can be provided to the same stator core 8 and magnetic levitation and turning force generation can be individually carried out, the number of rotors 3 and the stator cores 8 can be reduced.

Further, a permanent magnet constituting a direct-current magnetic field generating means 4 is attached to a part of the yoke portion 9. The direct-current magnetic field generating means 4 is arranged in the vicinity of each motor magnet 10.

The stator core 8 is provided to each of both ends of the stator 2. Furthermore, an outer peripheral surface of each stator core 8 is opposed to each motor magnet 10 and each yoke portion 9. The first stator winding 6 wound around each stator core 8 generates two magnetic circuits of the levitation control magnetic flux 5. On the other hand, a thrust bearing winding 13 and thrust bearing stators 14 adjacent to the thrust bearing winding 13 on both sides in the axial direction are provided between two sets of the stator cores 8 set apart from each other in the axial direction (direction z). Moreover, a stator side yoke portion 20 is provided between the stator core 8 and the thrust bearing stator 14.

The operation of the magnetic levitation motor 1 will now be described hereinafter.

By energizing the first stator winding 6 wound as shown in FIG. 5, two magnetic circuits of the levitation control magnetic flux 5 going through the stator cores 8 and the rotor 3 are formed. The levitation control magnetic flux 5 forms a magnetic field to levitate the rotor 3 in the radial direction together with a bias magnetic flux 11 formed by the direct-current magnetic field generating means 4. Here, since the stator core 8 is opposed to the motor magnet 10 and the yoke portion 9, a part of the levitation control magnetic flux 5 and a part of bias magnetic flux 11 go through the motor magnet 10, and the remaining magnetic fluxes are directly bypassed to the stator core 8 from the yoke portion 9 without passing through the motor magnet 10. Then, the rotor 3 is levitated in the radial direction. Therefore, as compared with a case that all of the levitation control magnetic flux 5 and all of the bias magnetic flux 11 go through the motor magnet 10 like the prior art, magnetic resistances when forming the levitation control magnetic flux 5 and the bias magnetic flux 11 can be decreased. The levitation force of the rotor 3, therefore, can be increased by heightening a magnetic flux density in the air gap G between the rotor 3 and the stator core 8.

Additionally, by energizing the thrust bearing winding 13, an even magnetic flux is formed to each of the thrust bearing stators 14 on the both sides of the thrust bearing winding 13, thereby levitating the rotor 3 in the thrust direction.

According to the magnetic levitation motor 1 of this embodiment, since the direct-current magnetic field generating means 4 is formed to the rotor 3, the density of the bias magnetic flux 11 can be increased as compared with a case that the direct-current magnetic field generating means 4 is formed to the stator 2. Further, since the first stator winding 6 is provided to a plurality of the stator cores 8 as shown in FIG. 5, the number of windings can be increased and the large levitation control magnetic flux 5 can be obtained as compared with a case that the first stator winding 6 is provided in accordance with each stator core 8.

Figure 2:
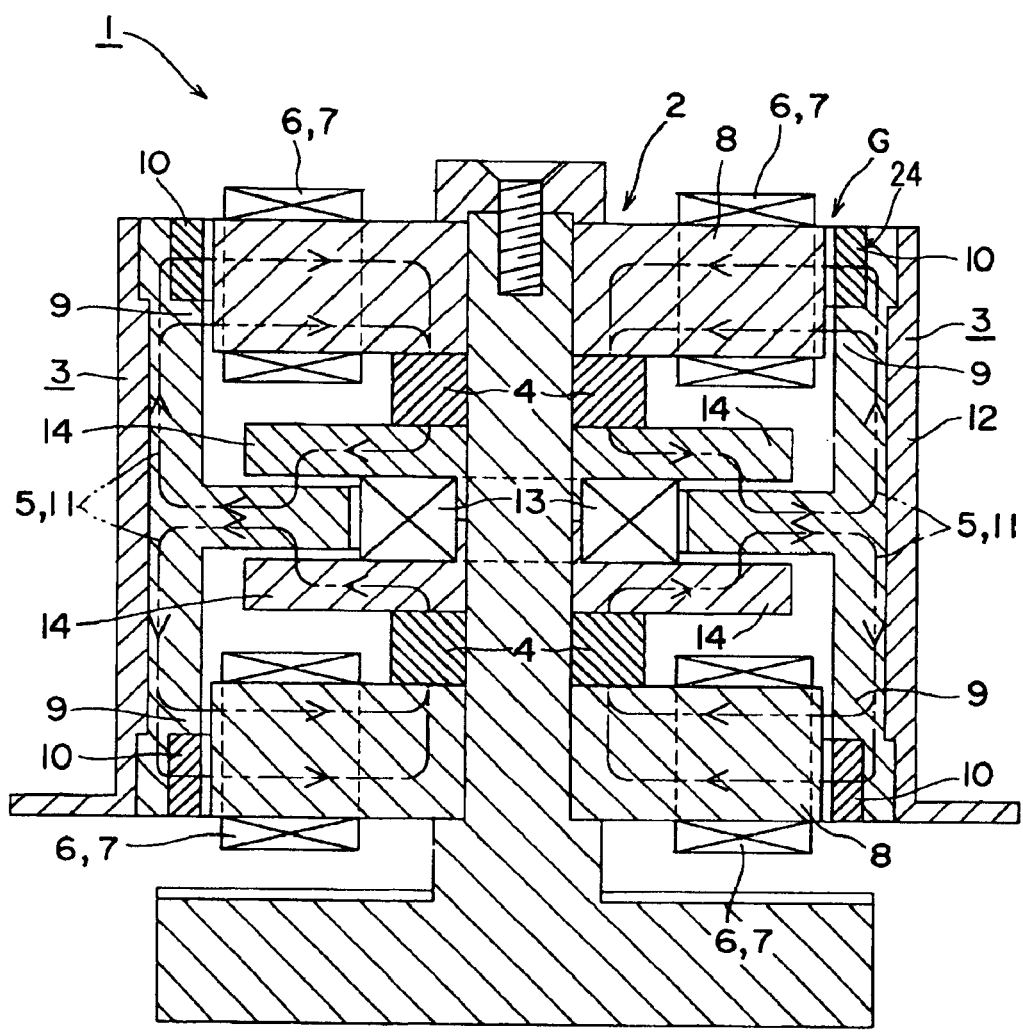
FIG. 2 is a vertical cross-sectional front view showing another example of the magnetic levitation motor.

It is to be noted that the above is one preferred embodiment according to the present invention, but it is not restricted thereto, and various modifications can be carried out without departing from the scope of the present invention. For example, although the direct-current magnetic field generating means 4 is provided to the rotor 3 in this embodiment, the present invention is not restricted thereto, and the direct-current magnetic field generating means 4 may be provided to the stator 2 as shown in FIG. 2. In this case, the rotor 3 can be levitated in the radial direction by utilizing the bias magnetic flux 11 obtained by the direct-current magnetic field generating means 4 and the levitation control magnetic flux 5 obtained by the first stator winding 6, and the levitation force of the rotor 3 can be increased by a part of each magnetic flux directly reaching each stator core 8 from the yoke portion 9.

Figure 3:
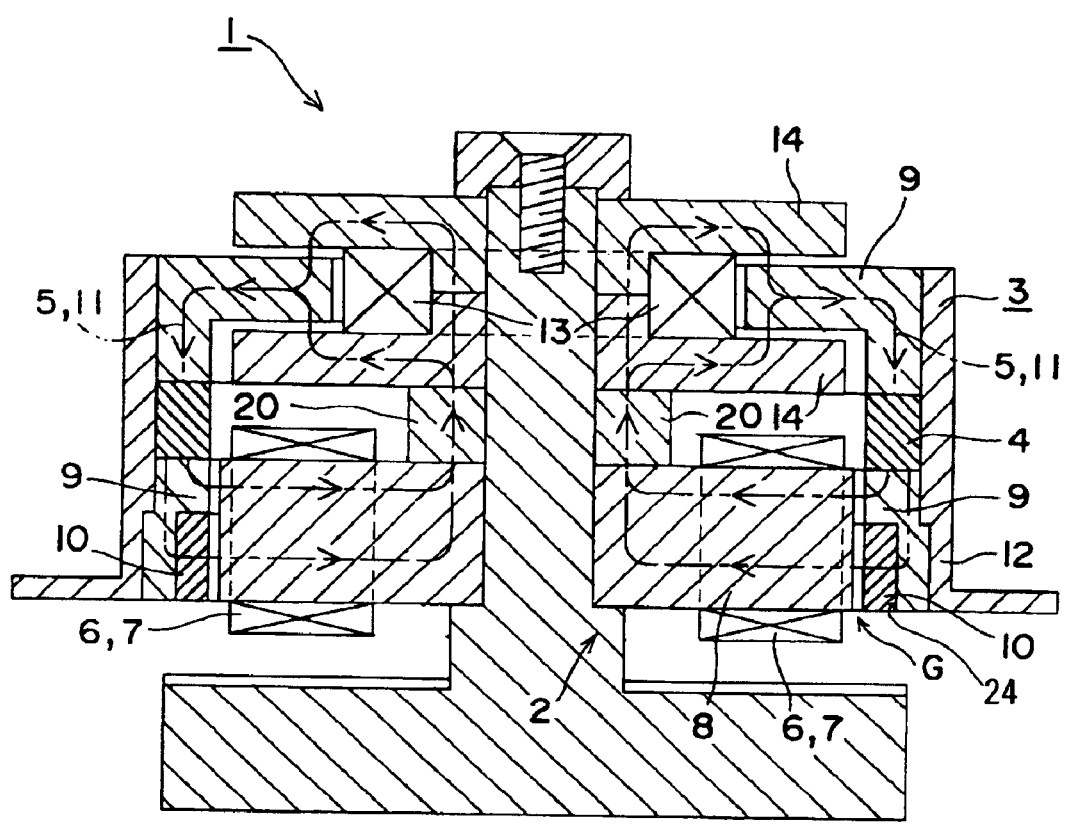
FIG. 3 is a vertical cross-sectional front view showing still another example of the magnetic levitation motor.
Figure 4:
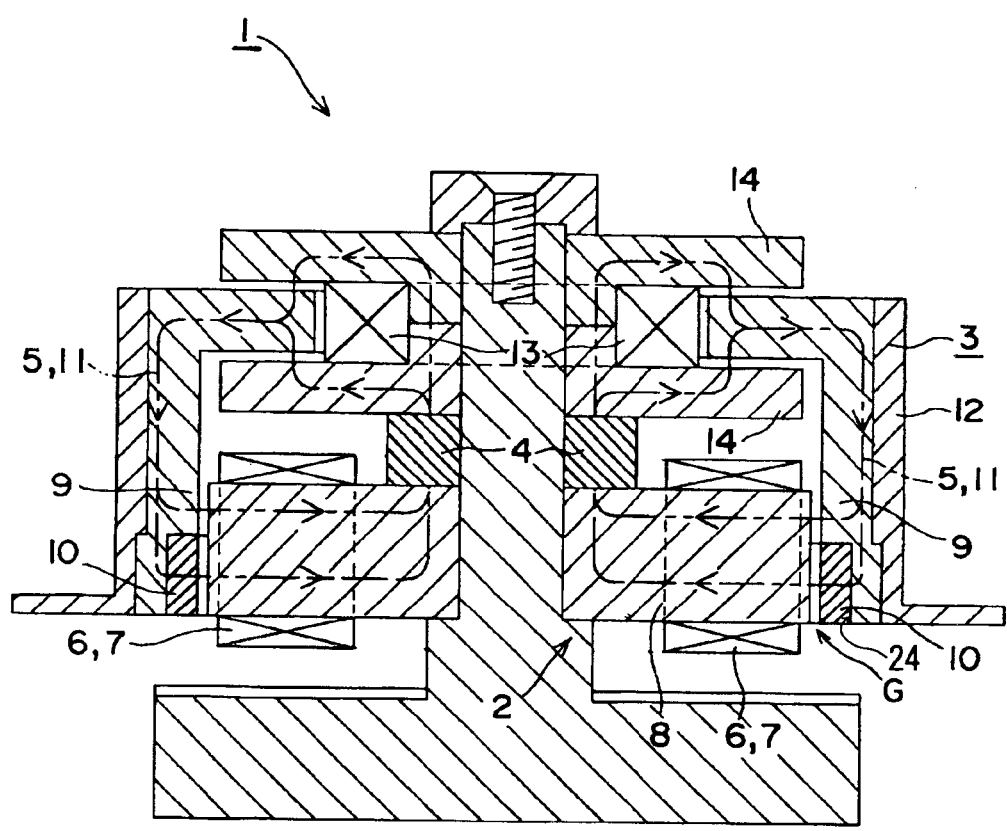
FIG. 4 is a vertical cross-sectional front view showing yet another example of the magnetic levitation motor.

Furthermore, although each of the foregoing embodiments adopts the five-axis control type that the stator core 8 is provided to each end portion of the stator 2 in the axial direction, the present invention is not restricted thereto, and it is possible to adopt a three-axis control type that the stator core 8 is provided to only one end portion in the axial direction. When the three-axis control type is employed, three axes, i.e., the direction x and the direction y on the lower side and the direction z on the thrust side are controlled. Here, the magnetic levitation motor 1 shown in FIG. 3 has the direct-current magnetic field generating means 4 provided to the rotor 3, and the magnetic levitation motor 1 shown in FIG. 4 has the direct-current magnetic field generating means 4 provided to the stator 2. According to these structures, the magnetic levitation motor 1 can be reduced in size.

Figure 6:
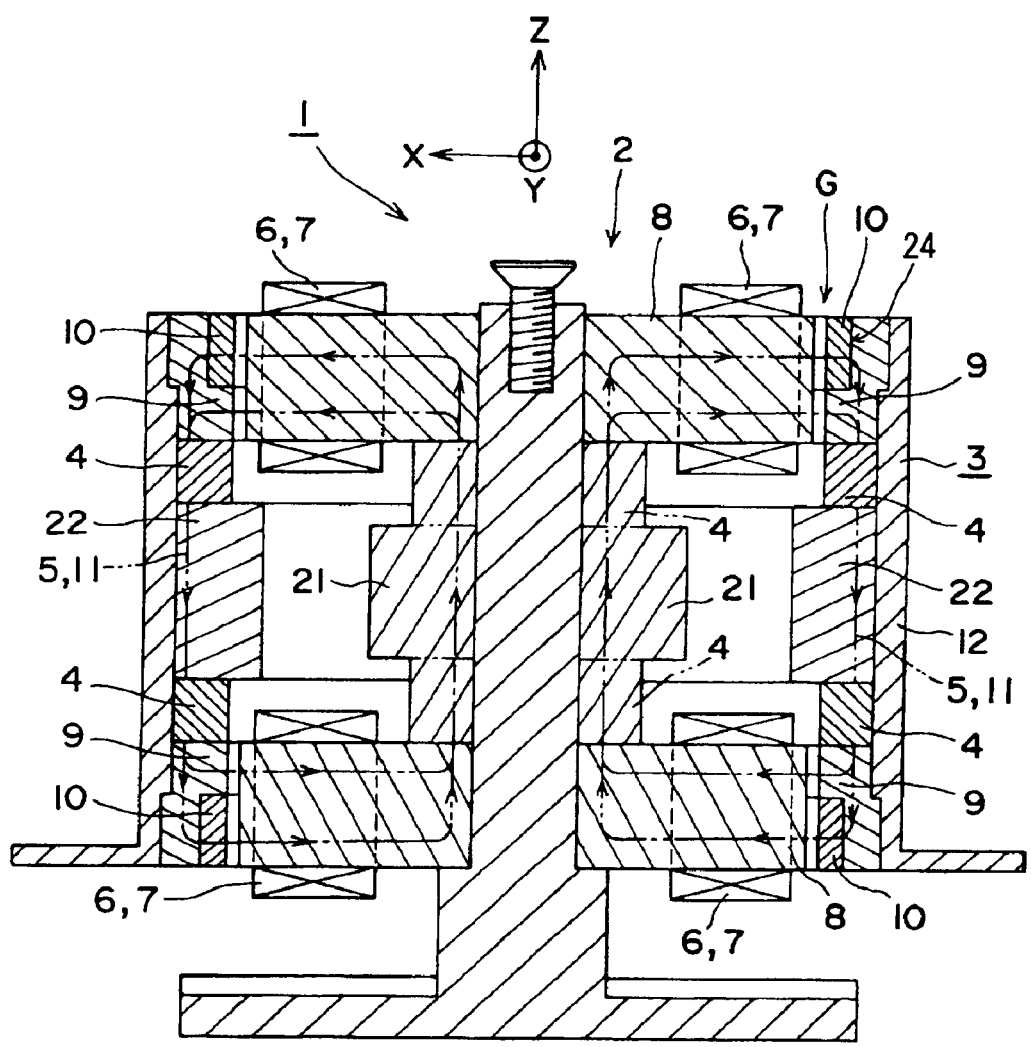
FIG. 6 is a vertical cross-sectional front view showing a further example of the magnetic levitation motor.

Alternatively, it is possible to adopt a four-axis control type that the stator core 8 is provided to each end portion in the axial direction and the thrust bearing portion at the central part is eliminated as shown in FIG. 6. When the four-axis control type is employed, four axes, i.e., the direction x and the direction y on the upper side and the direction x and the direction y on the lower side are controlled as shown in FIG. 6. This magnetic levitation motor 1 includes: a spacer 21 provided between the stator cores 8; direct-current magnetic field generating means 4 adjacent to the central side of the yoke portion 9 in the axial direction which is opposed to each stator core 8; and a spacer 22 provided between the respective direct-current magnetic field generating means 4. In this magnetic levitation motor 1, a magnetic circuit of the bias magnetic flux 11 and the levitation control magnetic flux 5 is constituted so as to be entirely circulated around the upper and lower stator cores 8, 8 and the respective spacers 21 and 22.

Moreover, although the direct-current magnetic field generating means 4 is provided between the yoke portions 9 in the embodiment shown in FIG. 6, the present invention is not restricted thereto, and the direct-current magnetic field generating means 4 may be provided between the stator cores 8, 8 as indicated by chain double-dashed lines in the drawing. Additionally, although the two direct-current magnetic field generating means 4 are provided on the upper and lower sides respectively in the embodiment shown in FIG. 6, the present invention is not restricted thereto, and only one direct-current magnetic field generating means 4 may be provided.

Figure 7:
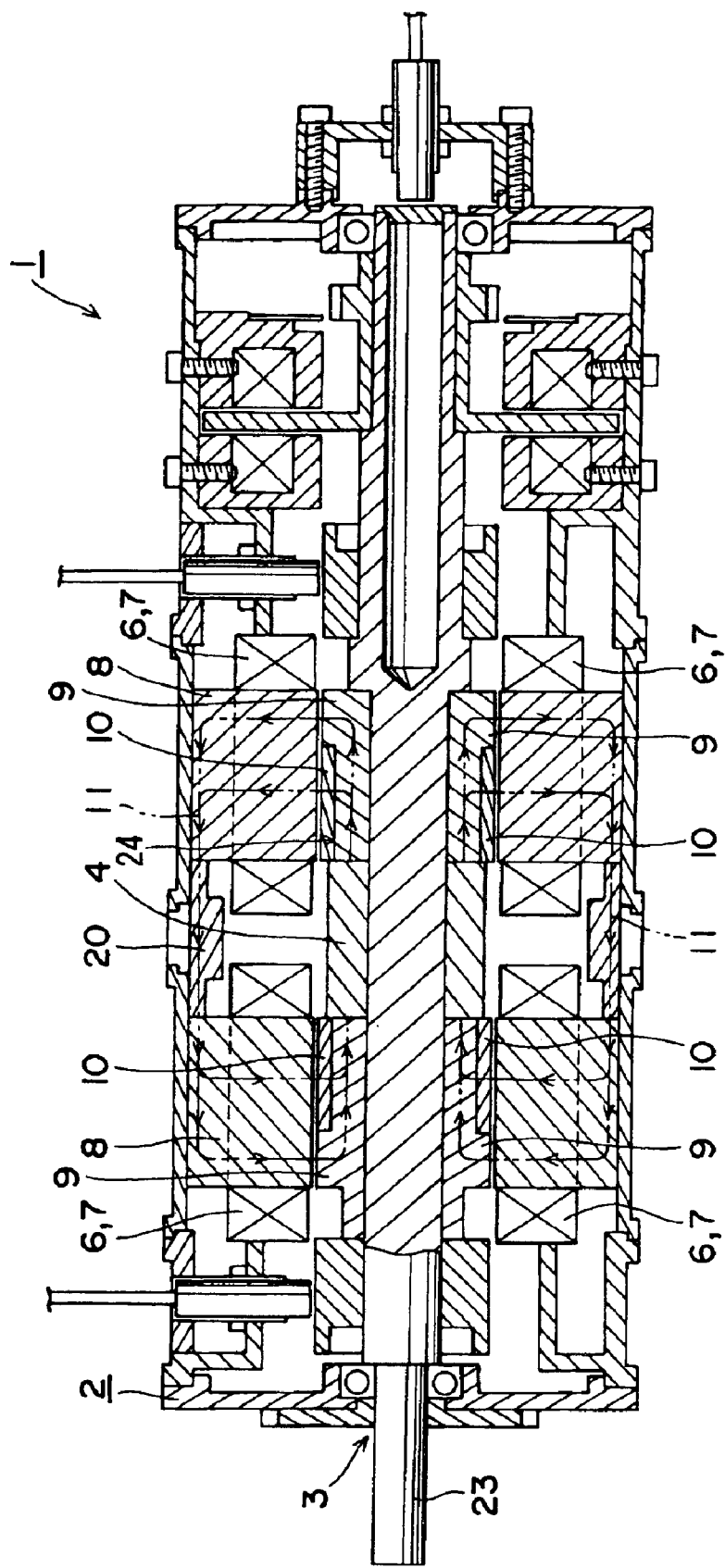
FIG. 7 is a vertical cross-sectional front view showing an example of an inner rotor type magnetic levitation motor.
Figure 8:
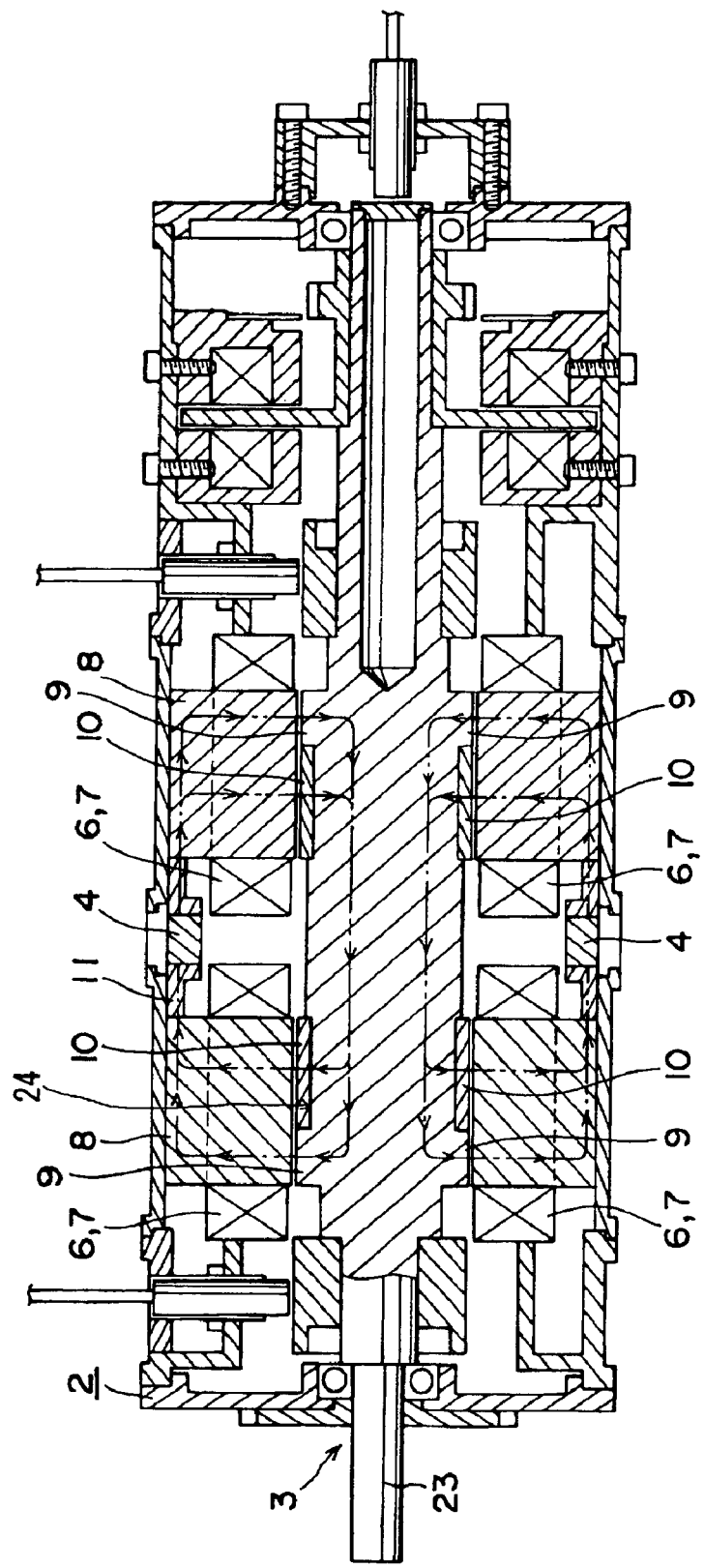
FIG. 8 is vertical cross-sectional front view showing another example of the inner rotor type magnetic levitation motor.

Further, the outer rotor type magnetic levitation motor 1 that the stator 2 is arranged on the inner side and the rotor 3 is arranged on the outer side is adopted in each of the foregoing embodiments, but the present invention is not restricted thereto, it is possible to employ an inner rotor type magnetic levitation motor 1 that the stator 2 is arranged on the outer side and the rotor 3 is arranged on the inner side as shown in FIGS. 7 and 8. In this case, the rotor 3 includes a rotary shaft 23; and yoke portions 9 and motor magnets 10 which are fitted to or integrally formed to the rotary shaft 23.

Furthermore, the magnetic levitation motor 1 shown in FIG. 7 has the direct-current magnetic field generating means 4 provided to the rotor 3, and the magnetic levitation motor 1 shown in FIG. 8 has the direct-current magnetic field generating means 4 provided to the stator 2.

Moreover, the number of magnetic poles of the rotor 3 is not less than six in the foregoing embodiments, but the present invention is not restricted thereto, and the number of magnetic poles of the rotor 3 may be less than six.

(Embodiment)

A magnetic flux density distribution of the air gap G between the stator core 8 and the rotor 3 was measured in simulation using the magnetic levitation motor 1 shown in FIG. 1. It was determined that a thickness of the stator core 8 in the axial direction is 6 mm and a thickness of the motor magnet 10 is 3.5 mm. Additionally, it was assumed that an inside diameter of the air gap G is 28 mm, an outside diameter of the same is 33 mm, a thickness of the motor magnet 10 in the radial direction is 2 mm, and a material is a rare earth permanent magnet.

Figure 9:
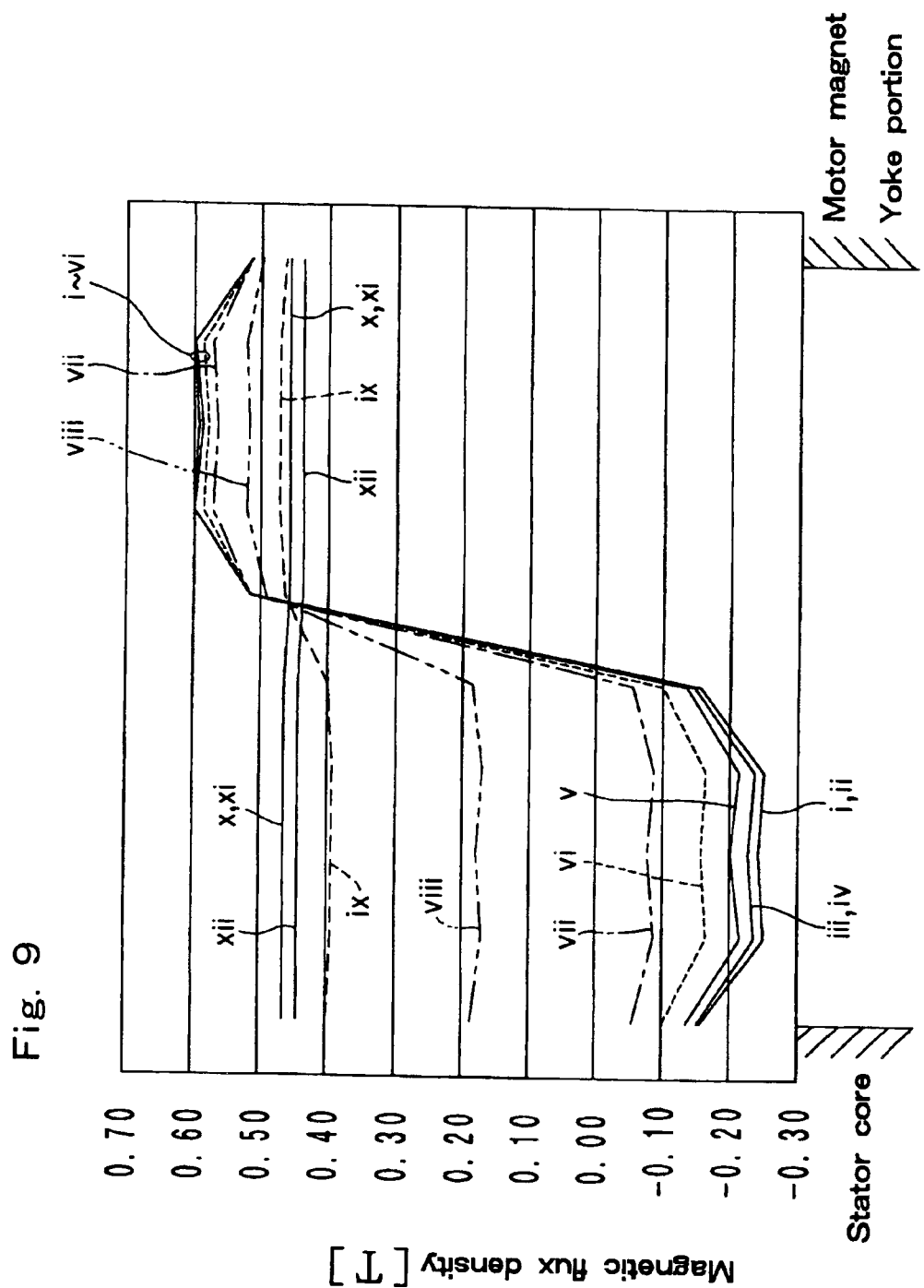
FIG. 9 is a graph showing a magnetic flux density of an air gap of the magnetic levitation motor.

Further, a magnetic flux density distribution of each block in a circumferential direction was calculated when the air gap G was evenly divided into 12 areas i to xii. FIG. 9 shows its result. Furthermore, an average value of the gap magnetic flux densities was 0.29 T.

In FIG. 9, blocks i to vii indicate parts opposed to the motor magnet 10, and blocks viii to xii indicate parts opposed to the yoke portion 9, respectively. In the parts opposed to the yoke portion 9, a substantially fixed gap magnetic flux density of approximately 0.45 T was obtained. Furthermore, in the block viii as a boundary surface of the yoke portion 9 relative to the motor magnet 10, a sinusoidal distribution was obtained due to the influence of the motor magnet 10.

An amplitude of the gap magnetic flux density in the parts opposed to the motor magnet 10 is substantially equal to that in a case that the yoke portion 9 is not provided (see a comparative example 1), but an average value was reduced by approximately 0.1 T since the bias magnetic flux 11 mainly flowed to the yoke portion 9. It can be expected that the magnetic flux distribution obtained by the stator winding 2 has a large magnetic flux density since the gap of the yoke portion 9 is small.

Assuming that the motor magnet 10 and the yoke portion 9 can be separated from each other, the levitation force to be generated is as represented by the following expressions 1 to 3.

$$Fmg = f \text{ (gap magnetic flux density: 0.195 T,} \quad \text{(Expression 1)}$$
$$\text{rotor magnetic flux density: 0.028 T)}$$
$$= 0.71 \text{ N}$$

where Fmg is a levitation force of the motor magnet, and the rotor magnetic flux density is a value at a coil current 0.5 A.

$$Fy = f \text{ (gap magnetic flux density: 0.428 T,} \quad \text{(Expression 2)}$$
$$\text{rotor magnetic flux density: 0.084 T)}$$
$$= 3.36 \text{ N}$$

where Fy is a levitation force of the yoke portion, and the rotor magnetic flux density is a value at a coil current 0.5 A.

$$F = Fmg + Fy \quad \text{(Expression 3)}$$
$$= 4.07 \text{ N (at the coil current 0.5 A)}$$

Therefore, comparing with the levitation force when the yoke portion 9 is not opposed to the stator core 8 (see the comparative example 1), an increase in levitation force which is approximately 2.7-fold can be expected by only increasing the core thickness 50%. Moreover, since the maximum gap magnetic flux density is as small as 0.6 T, a thickness of the direct-current magnetic field generating means 4 in the axial direction can be increased. Therefore, generation of the larger radial levitation force can be expected.

(Comparative Example 1)

Figure 10:
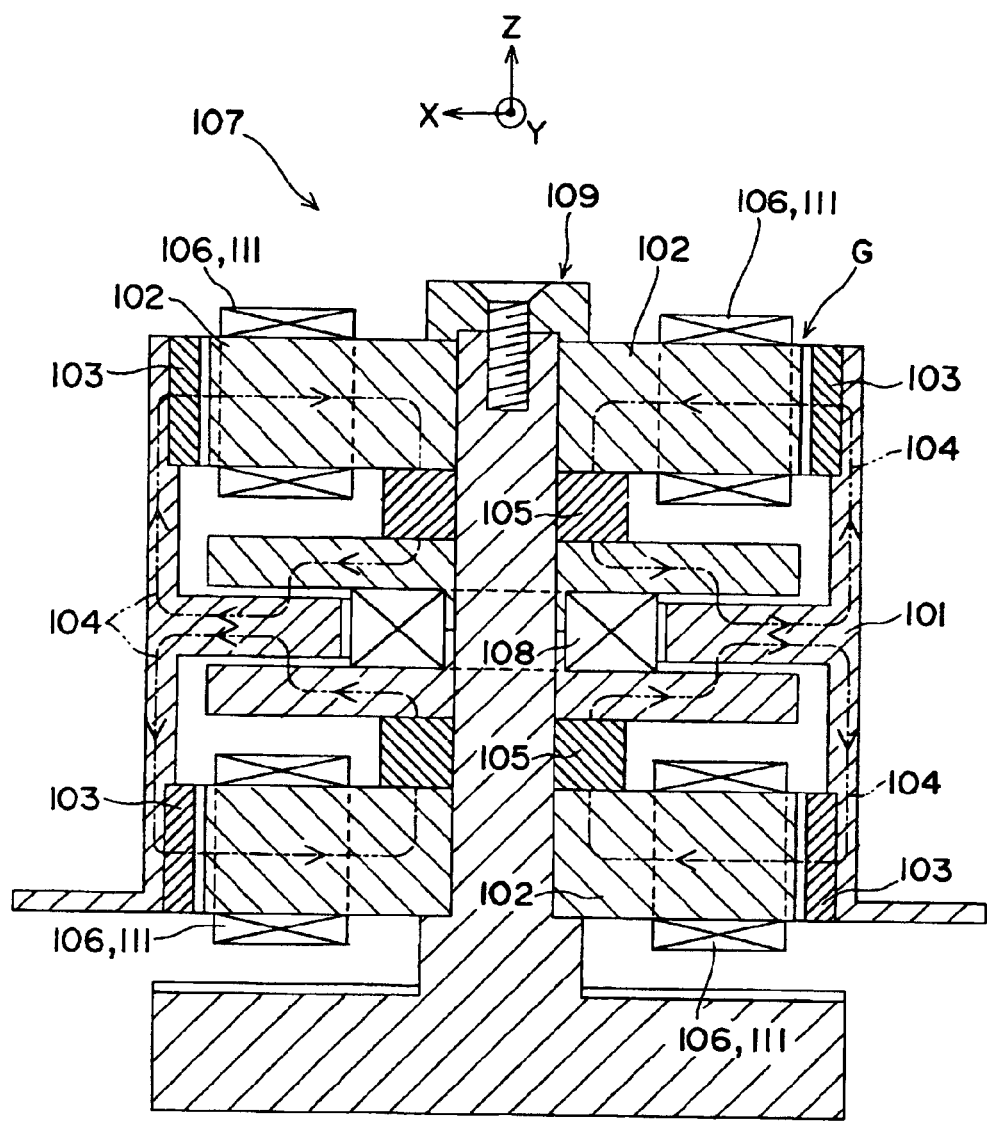
FIG. 10 is a vertical cross-sectional front view showing a conventional magnetic levitation motor.
Figure 11:
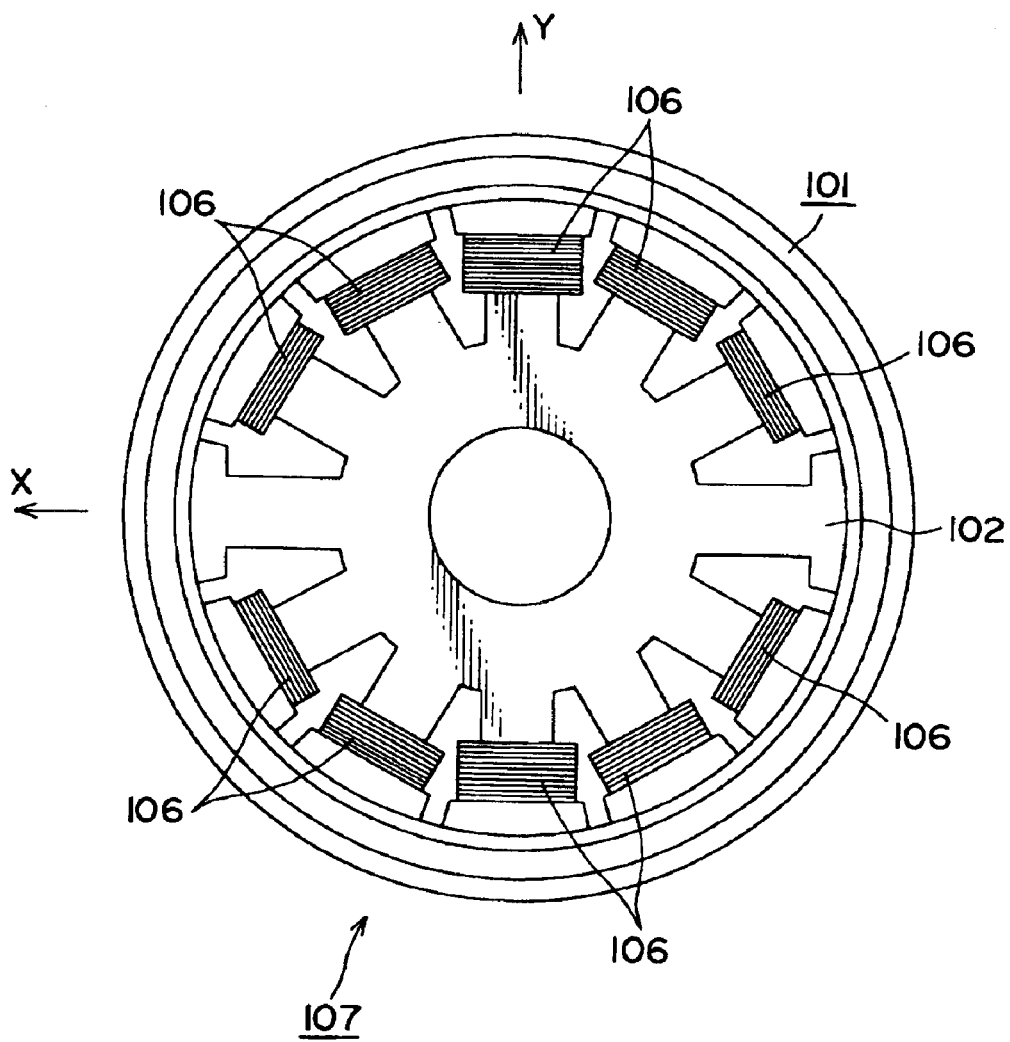
FIG. 11 is a plane view showing how to wind a conventional first stator winding.

The magnetic flux density distribution of an air gap G between a stator core 102 and a rotor 101 was measured by using a magnetic levitation motor 107 shown in FIGS. 10 and 11. It was determined that a thickness of the stator core 102 in the axial direction is 4 mm and a thickness of the motor magnet 103 in the axial direction is 4 mm. Additionally, it was assumed that an inside diameter of the air gap G is 28 mm, an outside diameter of the same is 33 mm, a thickness of the motor magnet 103 in the radial direction is 2 mm, and a material is a rare earth permanent magnet.

Figure 12:
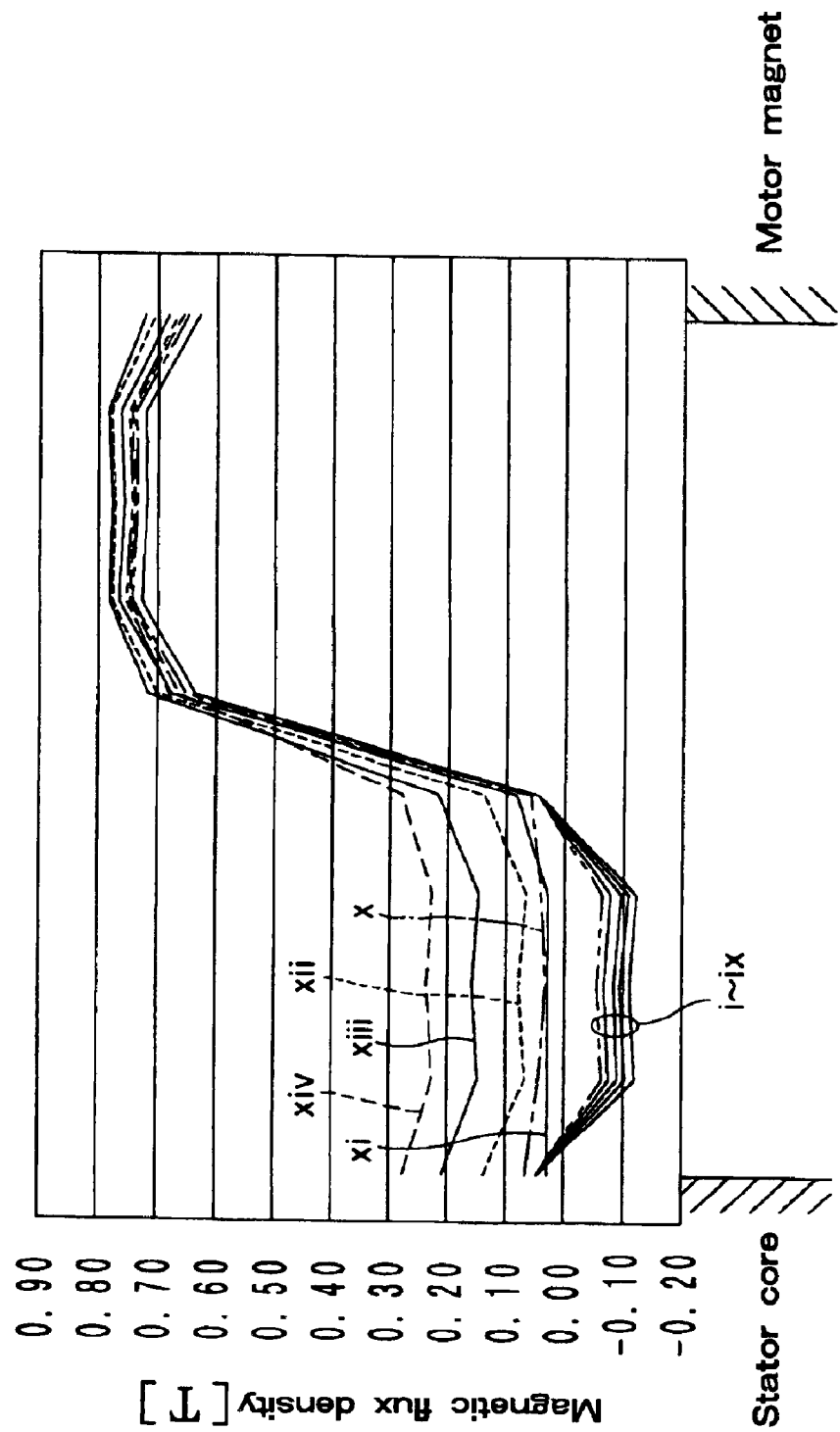
FIG. 12 is a graph showing a magnetic flux density of an air gap of a conventional magnetic levitation motor.

Further, the magnetic flux density distribution of each block in a circumferential direction was calculated when the air gap G was divided into 14 blocks in the axial direction. FIG. 12 shows its result. Furthermore, an average value of the gap magnetic flux densities was 0.364 T.

As shown in the drawing, since the maximum gap magnetic flux density is approximately 0.8 T, there is concern about magnetic saturation in the actual stator core 102, but a target average magnetic flux density (0.3 T) was satisfied. It is to be noted that the levitation force in this case is 1.51 N at a levitation coil current 0.5 A, and it was found that the levitation force which can support the tare weight at the levitation coil current 0.5 A can be generated.

(Comparative Example 2)

The magnetic-flux density of the radial air gap G obtained by a direct-current magnetic field generating means 105 was measured by a gauss meter in the magnetic levitation motor 107 shown in FIGS. 10 and 11 with the motor magnet 103 being removed therefrom. It was determined that the direct-current magnetic field generating means 105 has an outside diameter of 11 mm, an inside diameter of 5 mm and a thickness in the axial direction of 2.6 mm and a material is rare earth permanent magnet. As a result, the maximum gap magnetic flux density (density $B_0$ of bias magnetic flux 11) was 0.08 T.

Moreover, the magnetic flux density of the radial air gap G obtained by the first stator winding 106 was measured by the gauss meter using the same magnetic levitation motor 107 with the motor magnet 103 being removed therefrom. Winding was carried out by a sinusoidal concentrated winding method that the winding is individually wound around each slot of the stator core 102 as shown in FIG. 11, but a limit of the motor winding per slot was 35 turns and a limit of the levitation winding was up to 45 turns. The sufficient magnetic flux density cannot be obtained with this winding method.

Thus, the winding was stretched between and wound around a plurality of the slots as shown in FIG. 5. Here, it was determined that a wire diameter of the winding is 0.17 mm, a long winding portion 15 has 40 turns, a medium winding portion 16 has 29 turns and a short winding portion 17 has 11 turns. Therefore, the composite maximum winding number was 80 turns. Consequently, the maximum magnetic flux density formed by the stator 2 winding was 0.026 T at the levitation coil current 0.5 A.

Based on these results, the radial levitation force of the magnetic levitation motor 107 was calculated. The radial levitation force is calculated based on Expression 4.

$$F = \frac{B_0 B_3 L r \pi}{\mu_0} \quad \text{(Expression 4)}$$

where
$B_0$: bias magnetic flux density
$B_3$: magnetic flux density obtained by the winding
L: length of the rotor in the axial direction (4 mm)
r: radius of the rotor (15 mm)
As a result, F=0.3 N was obtained at the levitation coil current 0.5 A.

Table 1 shows results of the above-described embodiment and the comparative examples.

TABLE 1

| | Set position of direct-current magnetic field generating means | Thickness of direct-current magnetic field generating means | Thickness of stator core | Levitation force at 0.5 [A] |
|---|---|---|---|---|
| Embodiment | Rotor | 2 mm | 6 mm | 4.07 [N] |
| Comparative example 1 | Rotor | 2 mm | 4 mm | 1.51 [N] |
| Comparative example 2 | Stator | 2.6 mm | 4 mm | 0.3 [N] |

As apparent from comparison between the comparative example 1 and the comparative example 2, it was found that the approximately fivefold levitation force can be expected when using the stator core 8 having the same stack thickness by setting the direct-current magnetic field generating means 4 on the rotor 3 side and increasing a cross sectional area of the magnet in order to review the bias magnetic circuit.

Moreover, as apparent from comparison between the embodiment and the comparative example 2, it was found that the 13-fold levitation force can be expected by determining the stack thickness of the stator core 8 as 6 mm which is 1.5-fold and determining a part with the increased thickness as the yoke portion 9 used to transmit the bias magnetic flux 11 therethrough.

What is claimed is:

1. A magnetic levitation motor which rotates a rotor in a levitated state with respect to a fixed stator, the magnetic levitation motor comprising:
    a direct-current magnetic field generating means for forming a magnetic flux having a radial pattern with an axis at a center in the stator and the rotor;
    a stator core having salient-pole portions formed so as to outwardly protrude in a radial pattern;
    a first stator winding for generating a levitation control magnetic flux to control levitation of the rotor in a radial direction; and
    a second stator winding for generating a rotating magnetic field to rotate the rotor, the rotor having a yoke portion and a motor magnet which are opposed to said stator core of the stator;
    wherein said yoke portion has a motor magnet attachment step portion and said motor magnet attachment step portion has a thickness in an axial direction, smaller than a thickness of the stator in the axial direction, and a thickness in a radial direction, substantially equal to a thickness of the motor magnet.

2. The magnetic levitation motor according to claim 1, wherein the direct-current magnetic field generating means is a permanent magnet.

3. The magnetic levitation motor according to claim 1, wherein the motor magnet and a permanent magnet as the direct-current magnetic field generating means are attached on both sides with a stator core opposed portion of the yoke portion, which is opposed to the stator core and excludes the motor magnet attachment step portion, being sandwiched therebetween.

4. The magnetic levitation motor according to claim 1, wherein a number of magnetic poles of the rotor is not less than six.

5. The magnetic levitation motor according to claim 1, wherein the motor magnet is a permanent magnet attached on a peripheral surface of the rotor.

6. The magnetic levitation motor according to claim 1, wherein the motor magnet is a permanent magnet embedded in a peripheral surface of the rotor.

7. A magnetic levitation motor which rotates a rotor in a levitated state with respect to a fixed stator, the magnetic levitation motor comprising:
    a direct-current magnetic field generating means for forming a magnetic flux having a radial pattern with an axis at a center in the stator and the rotor;
    a stator core having salient-pole portions formed so as to outwardly protrude in a radial pattern;
    a first stator winding for generating a levitation control magnetic flux to control levitation of the rotor in a radial direction; and
    a second stator winding for generating a rotating magnetic field to rotate the rotor, the rotor having an inner surface which is opposed to said salient-pole portions of said stator core of the stator and comprises a yoke portion and a motor magnet;
    wherein said yoke portion has a motor magnet attachment step portion and said motor magnet attachment step portion has a thickness in an axial direction, smaller than a thickness of the stator in the axial direction, and a thickness in a radial direction, substantially equal to a thickness of the motor magnet.

8. The magnetic levitation motor according to claim 7, wherein the direct-current magnetic field generating means is a permanent magnet.

9. The magnetic levitation motor according to claim 7, wherein the motor magnet and a permanent magnet as the direct-current magnetic field generating means are attached on both sides with a stator core opposed portion of the yoke portion, which is opposed to the stator core and excludes the motor magnet attachment step portion, being sandwiched therebetween.

10. The magnetic levitation motor according to claim 7, wherein a number of magnetic poles of the rotor is not less than six.

11. The magnetic levitation motor according to claim 7, wherein the motor magnet is a permanent magnet attached on a peripheral surface of the rotor.

12. The magnetic levitation motor according to claim 7, wherein the motor magnet is a permanent magnet embedded in a peripheral surface of the rotor.

* * * * *